(12) United States Patent
Plagens et al.

(10) Patent No.: US 11,385,461 B2
(45) Date of Patent: Jul. 12, 2022

(54) HEAD-UP DISPLAY

(71) Applicant: Continental Automotive GmbH, Hannover (DE)

(72) Inventors: Nico Plagens, Aschaffenburg (DE); Dirk Brömme-Jártimová, Stegen (DE); Bertram Eschenbach, Röllbach (DE); Daniel Krüger, Michelstadt (DE)

(73) Assignee: Continental Automotive GmbH

( * ) Notice: Subject to any disclaimer, the term of this patent is extended or adjusted under 35 U.S.C. 154(b) by 128 days.

(21) Appl. No.: 16/705,936

(22) Filed: Dec. 6, 2019

(65) Prior Publication Data

US 2020/0117000 A1    Apr. 16, 2020

Related U.S. Application Data (63) Continuation of application No. PCT/EP2018/064865, filed on Jun. 6, 2018.

(30) Foreign Application Priority Data

Jun. 9, 2017 (DE) .................. 10 2017 209 787.6

(51) Int. Cl.
*G02B 27/01* (2006.01)
*G02B 5/08* (2006.01)
*G06F 3/14* (2006.01)

(52) U.S. Cl.
CPC ........... *G02B 27/0101* (2013.01); *G02B 5/08* (2013.01); *G02B 2027/0118* (2013.01); *G06F 3/14* (2013.01)

(58) Field of Classification Search
CPC .................. G02B 27/0101; G02B 5/08; G02B 2027/0118; G06F 3/14
See application file for complete search history.

(56) References Cited

U.S. PATENT DOCUMENTS

| 6,791,057 | B1 | 9/2004 | Kratzsch et al. | |
| 2009/0122294 | A1* | 5/2009 | Okada | G02B 27/1093 |
| | | | | 356/4.01 |
| 2011/0116040 | A1 | 5/2011 | Biernat et al. | |
| 2015/0098029 | A1 | 4/2015 | Sato et al. | |
| 2016/0335959 | A1 | 11/2016 | Kuraishi et al. | |
| 2018/0017794 | A1 | 1/2018 | Zeh et al. | |
| 2018/0184059 | A1* | 6/2018 | Arakawa | G02B 26/101 |

FOREIGN PATENT DOCUMENTS

| CN | 103748513 A | 4/2014 |
| DE | 19852302 A1 | 5/2000 |
| DE | 102008011836 A1 | 9/2009 |
| DE | 102014203324 B3 | 8/2015 |

(Continued)

OTHER PUBLICATIONS

JPO Notice of Reasons for Refusal drafted Nov. 6, 2020 for the counterpart Japanese Patent Application No. 2019-559699.

(Continued)

*Primary Examiner* — Kimberly N. Kakalec (57) ABSTRACT

A head-up display that comprises a light source, a display element, at least one mirror, a photodiode and a mirror element. The at least one mirror has a mirror surface that has a hole in at least one location, and the photodiode is arranged in the beam path of the light that passes through the hole.

6 Claims, 4 Drawing Sheets

(56) References Cited

FOREIGN PATENT DOCUMENTS

| | | |
|---|---|---|
| DE | 102015217938 A1 | 3/2017 |
| DE | 102016112826 A1 | 1/2018 |
| EP | 0570037 A1 | 11/1993 |
| EP | 2843652 A1 | 3/2015 |
| EP | 3163873 A1 | 5/2017 |
| JP | S63189827 A | 8/1988 |
| JP | H0650953 A | 2/1994 |
| JP | 2005331624 A | 12/2005 |
| JP | 2006235274 A | 9/2006 |
| JP | 2012003092 A | 1/2012 |
| JP | 2014010409 A | 1/2014 |
| JP | 2014010490 A | 1/2014 |
| JP | 2015132658 A | 7/2015 |
| WO | 2011132407 A1 | 10/2011 |

OTHER PUBLICATIONS

European Patent Office Action dated Dec. 4, 2020 for the counterpart European Patent Application No. 18 730 326.8.

Office Action dated Feb. 9, 2018 from corresponding German Patent Application No. DE 10 2017 209 787.6.

International Search Report and Written Opinion dated Oct. 15, 2018 from corresponding International Patent Application No. PCT/EP2018/064865.

Chinese First Office Action dated Mar. 30, 2021 for the corresponding Chinese Patent Application No. 201880031014.6.

\* cited by examiner

HEAD-UP DISPLAY

CROSS-REFERENCE TO RELATED APPLICATIONS

This application is a Continuation of PCT International Application No. PCT/EP2018/064865, filed Jun. 6, 2018, which claims priority to German Patent Application No. DE 10 2017 209 787.6, filed Jun. 9, 2017, wherein the contents of such applications are incorporated herein by reference.

TECHNICAL FIELD

The present invention relates to a head-up display comprising a mirror. Head-up displays are utilized in vehicles, motor vehicles for example, to project information, for example information about a vehicle state, into the visual field of the driver and to overlay it on the surroundings.

BACKGROUND

A known head-up display has a light source, a display element, at least one mirror, a photodiode and a mirror element. The mirror here is semi-reflective and reflects part of the light impinging on it onto the photodiode which is part of a control loop for controlling the luminous flux of the light source. Only the light that passes through the semi-reflective mirror, that is the transmitted light, is available for the generation of a virtual image. This is overlaid on the surroundings by means of the mirror element, in this case the windscreen of a vehicle. It can be seen to be disadvantageous in this known head-up display that the mirror serves only to direct light onto the photodiode. It costs money, requires installation space, and only allows a part of the light that impinges on it to pass, which reduces the luminous flux available for image generation.

A laser projection display is known which comprises a strongly wavelength-dependent semi-reflective mirror for coupling light out onto a photodiode of a luminous flux control loop. There is a strong dependency on wavelength, since a dichroic mirror, what is known as an interference mirror or an interference filter, is involved. Such special components are complex to manufacture and therefore relatively expensive. Here again, the entire mirror surface is used for the outward coupling, the luminous flux that passes through the semi-reflective mirror is thus strongly reduced. This reduction in the transmitted luminous flux is disadvantageous for the generation of the brightest possible virtual image.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A head-up display comprises a light source, a display element, at least one mirror, a photodiode and a mirror element. The at least one mirror comprises a mirror surface which comprises a hole at at least one location. The photodiode is arranged behind the hole in the beam path of the light that passes the hole in the direction of the beam. Therefore, a separate component for coupling out the light that falls on the photodiode is not necessary, since the mirror is a component located in any case in the beam path of an image-producing unit of the head-up display, which is given the additional function of coupling out light for the photodiode. A hole in a mirror can be manufactured economically, so that not only installation space but also manufacturing costs are saved. If the hole only takes up a small proportion of the mirror surface, then it is also true that only a low loss in luminous flux occurs. As a result, the system has a high optical efficiency. A loss of luminous flux due to a passage, associated with loss, through a semi-reflective optical layer does not occur, since the incoming light does not have to pass through any additional optical element, and thus no loss in luminous flux arises as a result of absorption.

The light source generates light that is modulated by the display element. The display element is driven by a signal generator, and generates a real image corresponding to the image that is to be represented which, further down the beam path, is transformed into a virtual image that is overlaid by the mirror element onto the image of the surroundings for display. The at least one mirror directs light in the beam path onto a further optical element, for example the mirror element, a further mirror, or the display element. The photodiode transforms the incoming radiation power into a photocurrent proportional to the incoming radiation intensity. This is used as a measured parameter for an indirect measurement of luminous flux. The luminous flux correlates to the image brightness. The output signal of the photodiode is used in a control loop in order to maintain the luminous flux output by the light source at the desired value.

In the case of a color display, the photodiode serves to measure the luminous flux of color components in the light output by the light source which, in this case, often consists of a plurality of individual light emitters for different wavelengths, in order, if relevant, to perform a white balance or another adjustment of the color distribution. In the presence of color signals in temporal sequence, a corresponding signal of the photodiode measured in the respective period of time of the color signal is used. If all the color signals are present simultaneously, a plurality of photodiodes that respond to the different wavelengths are provided. A different embodiment provides only one photodiode and a filter wheel with color filters corresponding to the wavelengths used.

The mirror element directs the light coming from the display element into the eye of an observer. The windscreen of the vehicle, or what is known as a combiner, serves, for example, as the mirror element. Both have the purpose of overlaying the light coming from the display element, possibly after passing through further optical elements such as a concave mirror, onto the light arriving from the surroundings, and thus of overlaying a virtual image of the display for the observer onto the image of the surroundings. Such a concave mirror has the function of transforming the real image of the display element into an enlarged virtual image.

The mirror surface of the at least one mirror can be either planar or curved. The mirror surface comprises a hole. The hole is at at least one location that takes up only a small portion of the total mirror surface. When holes are located at multiple locations, these are each correspondingly even smaller, and lead to an even smaller impairment of the reflected light bundle and are thus even less noticeable to the observer than a single hole. A higher number of holes brings about a reduction in the artefacts arising in the virtual image of the head-up display as a result of the hole in the mirror. The light falling on the mirror surface at the hole is accordingly not deflected through the angle dictated by the mirror surface, but is coupled out of the main luminous flux falling onto the mirror surface. The proportion of light that is coupled out is accordingly not reflected through the angle dictated by the mirror surface, but passes the mirror through the hole. The photodiode is arranged behind the hole, which means that it is in the beam path of the light that passes through the hole. It can also be arranged directly in the hole.

The hole may be a bore in a substrate that supports the mirror surface. Therefore, the bore can be made in the substrate before application of the mirror surface, so that this can be applied without being impaired by the manufacture of the bore. This enables economic manufacture, and prevents the hole causing an impairment of the optical properties of the mirror surface going beyond the presence of the hole. The bore can be arranged perpendicular to the mirror surface, for example when the photodiode is arranged directly in the hole, or also, at an angle differing from 90° to the mirror surface, corresponding to the angle of incidence of the light bundle meeting the mirror surface. The bore can be introduced by drilling into the substrate, or also in some other manner. In the case, for example, of a plastic substrate the hole can be kept free at the time the substrate is manufactured.

The bore may have a diameter that changes in the direction of the bore, and thus has a correspondingly changing cross-section. Thus, the mechanical stability of the substrate is affected to the minimum possible extent. In this way the mirror surface retains its intended form even when the substrate is subject to mechanical, thermal or some other stress, and that its optical properties are thus not impaired.

In the case of light bundles falling on the mirror surface divergently or with parallel beams, the cross-section tapers from the side of the substrate facing away from the mirror surface in order to have the smallest possible cross-section at the mirror surface. In the case of a light bundle falling convergently on the mirror surface, the change in the cross-section is accordingly inverted. The cross-section can also be stepped, for example in order not to have a sharp edge adjacent to the mirror surface.

In one embodiment, the bore is mirror-coated on its inner surface, at least in its region close to the mirror surface. Thus, absorption of light reaching the walls of the bore, that is its inner surface, is prevented, so that as far as possible all the light falling through the hole reaches the photodiode. The bore, or at least its upper part, is also mirror-coated when the mirror surface is applied. If the mirror surface is vapor-deposited, then particles that penetrate the bore strike its wall, and thus give it a mirror coating. The mirror coating here is almost as effective, at least in the upper region of the bore, as on the mirror surface. This may be used, in particular, when the upper region of the bore is stepped.

According to one variant, it is provided that the hole is formed through a location in the mirror surface that is not mirror-coated. Thus, on a surface that is not mirror-coated and is easily manufactured, for example by means of a mask when mirror-coating a substrate. By burning a hole in the mirror surface, for example by a laser pulse, through focused incoherent light or something similar, or through the application of a material that does not allow the mirror material to adhere to the substrate, or through similar measures. The substrate here is transparent, at least in the region of the hole and its close surroundings, and the photodiode is arranged behind the transparent part of the substrate. In this variant, the mechanical and thermal properties of the substrate are not impaired. If the entire substrate is uniformly transparent, then it has properties that are uniform or at least only gradually changing over its entire extent, and a possible sudden change in the properties at material boundaries does not occur.

According to a further variant, it is provided that the hole is formed by a reflection element lying outside the mirror surface. Thus, manufacture neither requires a bore to be introduced nor a hole to be arranged in the mirror coating. This simplifies the process of manufacture. A mirror element that is applied to the mirror surface, for example being glued, can be provided as the reflection element. It is also possible to provide a protrusion on the substrate that is mirror-coated at the same time as the application of the mirror surface. An indentation in the substrate can in the same way be mirror-coated at the same time as the application of the mirror surface.

The mirror is arranged further down the beam path following an illumination homogenization element. Thus, the light that leaves the illumination homogenization element has a very homogeneous intensity distribution over the beam cross-section, so that light that is coupled out by means of the hole and detected by the photodiode enables a representative measurement of the luminous flux without having to be located at a precisely defined position. A time-consuming and expensive adjustment process during the manufacture, in particular, when assembling the individual elements is thus avoided.

In one embodiment, the mirror is a folded mirror. Thus, folding the beam path so that the optical elements, for example a light source and the display element, are arranged in the most space-saving way possible. An imaging microlens array, together with a lens located behind the microlens array in the beam direction is, for example, provided as the illumination homogenization element.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Further details and advantages of the invention can also be found in the following description of exemplary embodiments with reference to figures. Here.

DETAILED DESCRIPTION

Details of the interior of the head-up display 2 are described with reference to the following figures. Elements that are the same or which have the same effect are here given the same reference signs, and are only described in more detail in connection with following figures when this appears necessary for understanding.

Figure 1:
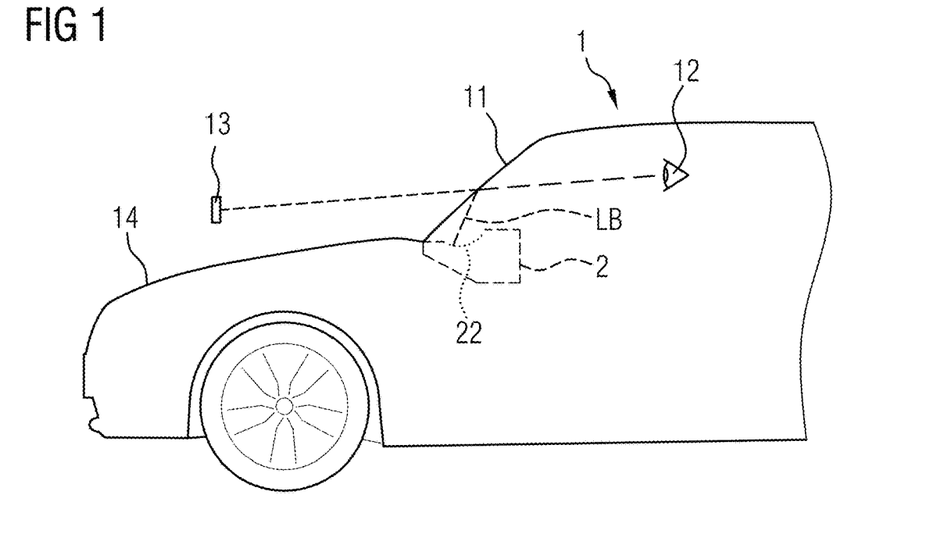
FIG. 1 shows a vehicle with a head-up display according to the invention

FIG. 1 shows a vehicle 1 with a head-up display 2 which comprises a transparent opening 22. A light bundle LB emerges from this and, coming from the head-up display 2, falls onto a windscreen 11 of the vehicle, from where it is reflected in the direction of the eye 12 of an observer. A virtual image 13 appears to the observer in front of the windscreen 11 above the engine hood 14 of the vehicle. The windscreen 11 acts here as the mirror element 21 of the head-up display.

Figure 2:
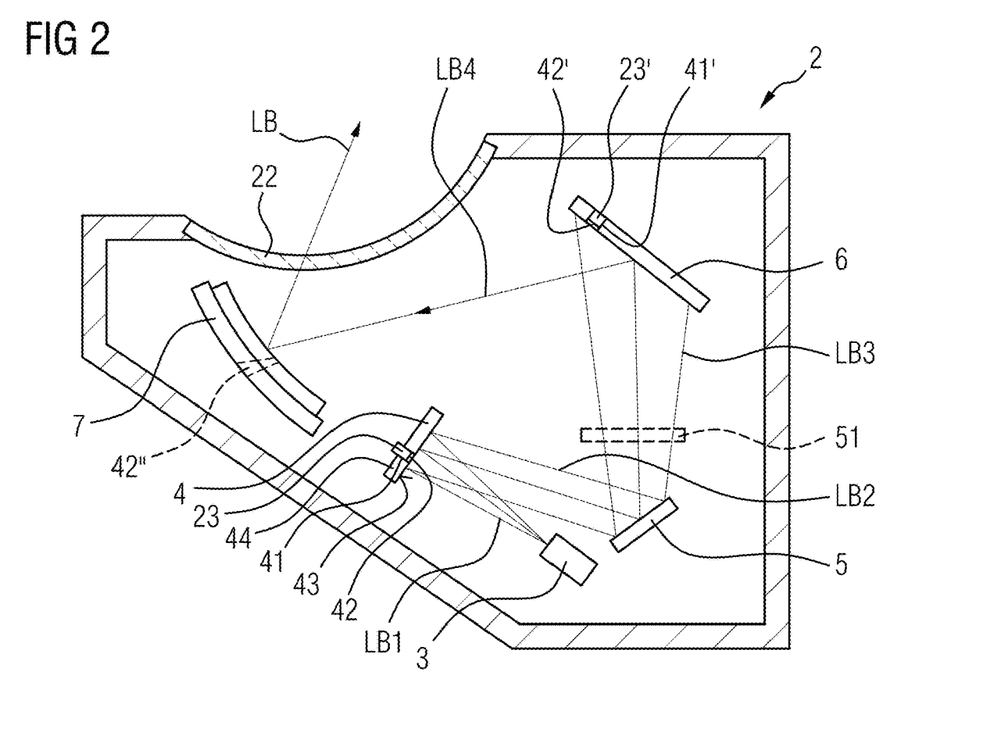
FIG. 2 shows a head-up display according to the invention

FIG. 2 shows a head-up display 2. The light source 3, from which a light bundle LB1 falls on a mirror 4, can be seen. It is guided from there as the light bundle LB2 onto a display element 5. The display element 5 is driven by a control unit, not illustrated here, and impresses an image onto the light bundle LB2 which the observer should be able to see as the virtual image 13. The display element 5 is shown here as a reflecting display element, for example as an LCoS display, as a reflecting liquid-crystal display, as an arrangement of a large number of small, controllable micromirrors, as what is known as a "digital micromirror device", also referred to as a DMD, or as a micromirror that can be tilted in the X and Y directions. The latter is, for example, realized as a 2D MEMS scanning mirror movable in both the X and Y directions, or as two 1D MEMS scanning mirrors, each of which can be moved in one of these directions. An image to be displayed is shown line by line by this means in a rasterized manner. MEMS here stands for a "Micro Electro Mechanical System", 1D for one-dimensional, and 2D for two-dimensional. A translucent display element 51 can be provided as an alternative to this instead of the reflecting display element 5. In this case, a mirror is provided at this location instead of the reflecting display element 5. A TFT display in the form of a liquid-crystal display is, for example, provided as the translucent display element 51. The light bundle LB3 impinges on a further mirror 6 from which it falls onto a concave mirror 7 that guides it, as the light bundle LB, through an opening 22 of the head-up display 2 in the direction of the windscreen 11. For the sake of simplicity, the light bundle LB, LB4, is only illustrated by one central beam. The curvature of the concave mirror 7 compensates for the curvature of the windscreen 11, so that the observer is able to see an undistorted virtual image 13.

The curvature furthermore fulfils the function of enlarging the real image of the display element 5 and transforming it into a virtual image. The function of the concave mirror 7 can, in a variant not illustrated here, also be fulfilled by a lens or a hologram. Even in the case of a head-up display often referred to as "mirrorless", there is a mirror that can be provided with a hole in the mirror surface according to the invention.

A photodiode 23 is arranged in a bore 41 in the mirror 4. The bore 41 follows on from a hole 42 in a mirror surface 43 of the mirror 4. It is located in a substrate 44 of the mirror 4. The output signal of the photodiode 23 is passed to a controller, not illustrated here, that regulates the output power of the light source 3.

As an alternative to arranging the hole 42 in the mirror 4, it is provided that a hole 42' is arranged in the mirror 6 that is arranged following the display element 5 in the optical beam path. Here again, the photodiode 23' is arranged in a bore 41'. Accordingly, an influence arising from the brightness or reflectivity of the display element 5 is included in the control of the light intensity. In this way, influences on the properties of the display element 5 arising from ageing or from the environment, such as temperature, humidity, clouding or the like, are compensated for. The same light intensity, however, is not present here, in the region of the hole 42' at all times, since this is necessarily modulated by the display element 5. In this case it is appropriate to use the intensity value of the display for the region of the hole 42' as the actual value for the intensity control.

An alternative solution is to perform the intensity control only when a defined intensity is to be expected at the location of the hole 42'. This is, for example, the case when a test cycle of the head-up display is being carried out, for example immediately after switching on, or when the corresponding location of the display element 5 is showing a bright display element. In order to reduce any possible confusion of the user, it is provided that the hole 42' is located in a region of the mirror 6 on which no light usually falls. This is the case when an information item that is to be displayed is never located there, in other words this region is not required for the reflection of light coming from the display element 5, since the corresponding region of the display element is never activated. This is taken into account when selecting the information to be displayed. A light point is only generated at the region of the display element that corresponds to this region of the mirror 6 during the test cycle.

A further, alternative embodiment consists in that a hole 42" is arranged in the concave mirror 7. This is suggested here by dashed lines. The photodiode that is located behind the hole 42" is not shown in this illustration. Similar considerations as for the previously described alternative apply to the signal evaluation in this embodiment. Making a hole in the concave mirror 7 is in any case manufactured in an adapted form for a specific vehicle or even for a specific one of a plurality of different shapes of windscreen provided for a vehicle. In this case the provision of the hole 42" only signifies a small additional effort. Standard components are then used for the other mirror which, due to high unit quantities, are economical.

Figure 3:
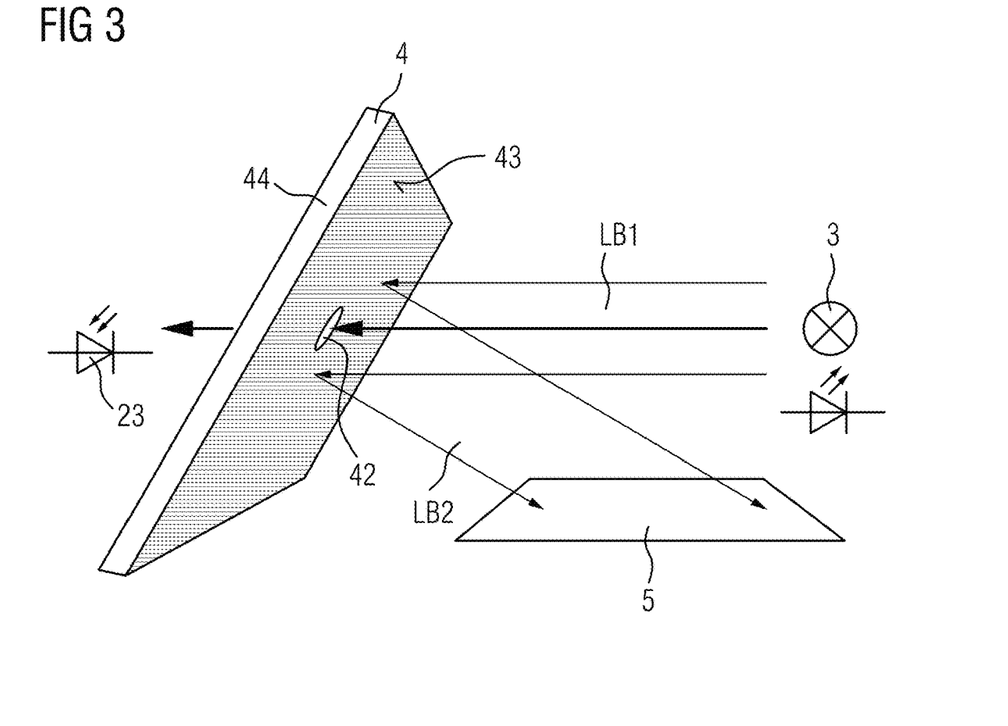
FIG. 3 shows a sketch of the principle of coupling light out by means of a hole

FIG. 3 shows a sketch of the principle of coupling light out by means of a hole in the mirror of a head-up display according to the invention, in particular of its imaging unit, which is also referred to as the PGU, in which only a few components are shown. A light source 3 is shown here symbolically as a light-emitting diode, but other sources of light can also be used here. It generates a light bundle LB1 that falls onto the mirror 4. It is reflected from there as the light bundle LB2 in the direction of the display element 5. A hole 42 is located in the mirror surface 43 of the mirror 4, through which a portion of the light bundle LB1 falling on the mirror surface 43 falls onto the photodiode 23. The substrate 44 to which the mirror surface 43 of the mirror 4 is applied here consists of glass, so that light falling through the hole 42 can pass through the substrate 44. The substrate can also consist of a transparent plastic instead of glass.

Figure 4:
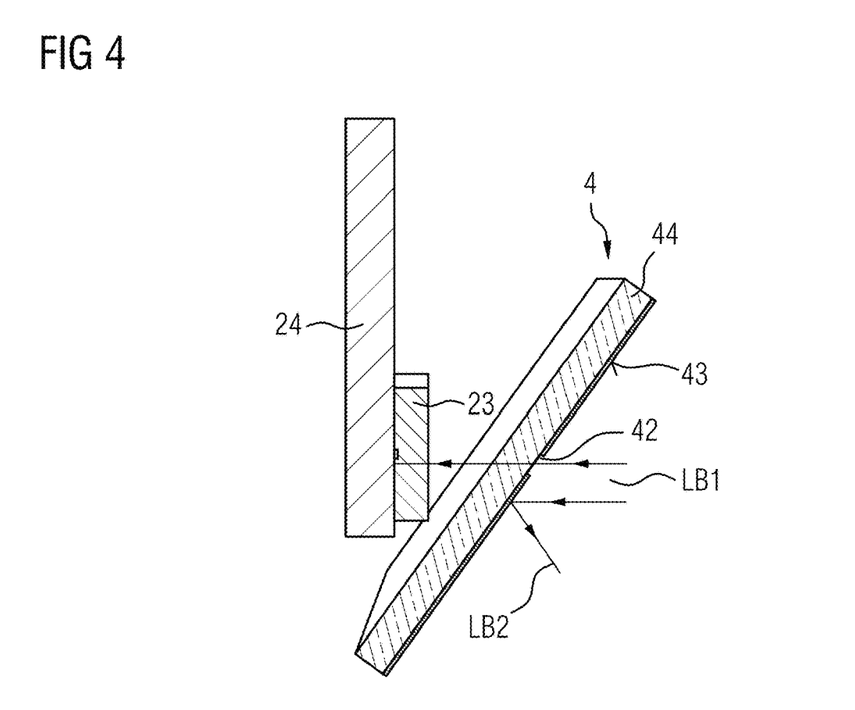
FIG. 4 shows a variant of a mirror with a hole

FIG. 4 shows a variant of a mirror 4 of an imaging unit of a head-up display according to the invention. Here again, the substrate 44 consists of glass, and a hole 42 is located in the mirror surface 43. The light bundle LB1 is reflected by the mirror surface 43 as the light bundle LB2. Only that portion of the light bundle LB1 that falls on the hole 42 passes through the substrate 44 and falls onto the photodiode 23. This is arranged on a circuit board 24 which in addition to this, also supports further components not shown here.

Figure 5:
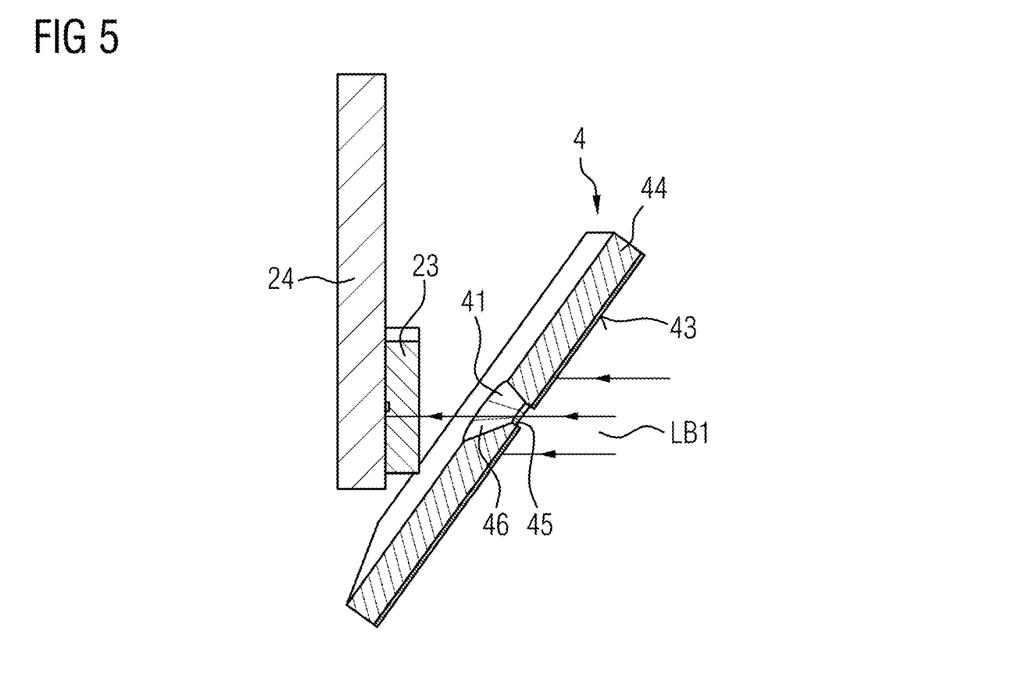
FIG. 5 shows a variant of a mirror with a hole

FIG. 5 shows a further variant of a mirror 4 of an imaging unit of a head-up display. The substrate 44 consists here of an opaque material, and comprises a bore 41. The bore 41 is implemented as an aperture which is not necessarily rotationally symmetrical or cylindrical but, as shown here, conical, with an axis extending at an angle to the normal of the mirror surface 43. A part of the light bundle LB1 falling on the mirror surface 43 falls through this bore 41 onto the sensor 23 which is located on a circuit board 24. The bore 41 has a cross-section that tapers down from the side of the mirror 4 facing the photodiode 23 towards its side that is provided with the mirror surface 43. On this side the bore 41 has a region 45 of constant cross-section which forms a step with the region 46 whose cross-section tapers.

The region 45 of constant cross-section is here dimensioned such that the substrate 44 has an adequate mechanical strength even at its thinnest location. Its thermal stability at this location is also sufficient for the requirements occurring during operation and during manufacture. During the application of the mirror surface 43, for example, a deformation of the substrate does not occur in the region of the hole 42 which would unacceptably impair the optical properties of the mirror 4 in this region. In the region 46 where the cross-section changes, the bore 41 has an axis of symmetry that is not aligned perpendicular to the mirror surface 43, but rather in the direction of the incoming light bundle LB2. The region 45 of constant cross-section is also mirror-coated, and is formed here with an axis of symmetry that is perpendicular to the mirror surface 43.

Figure 6:
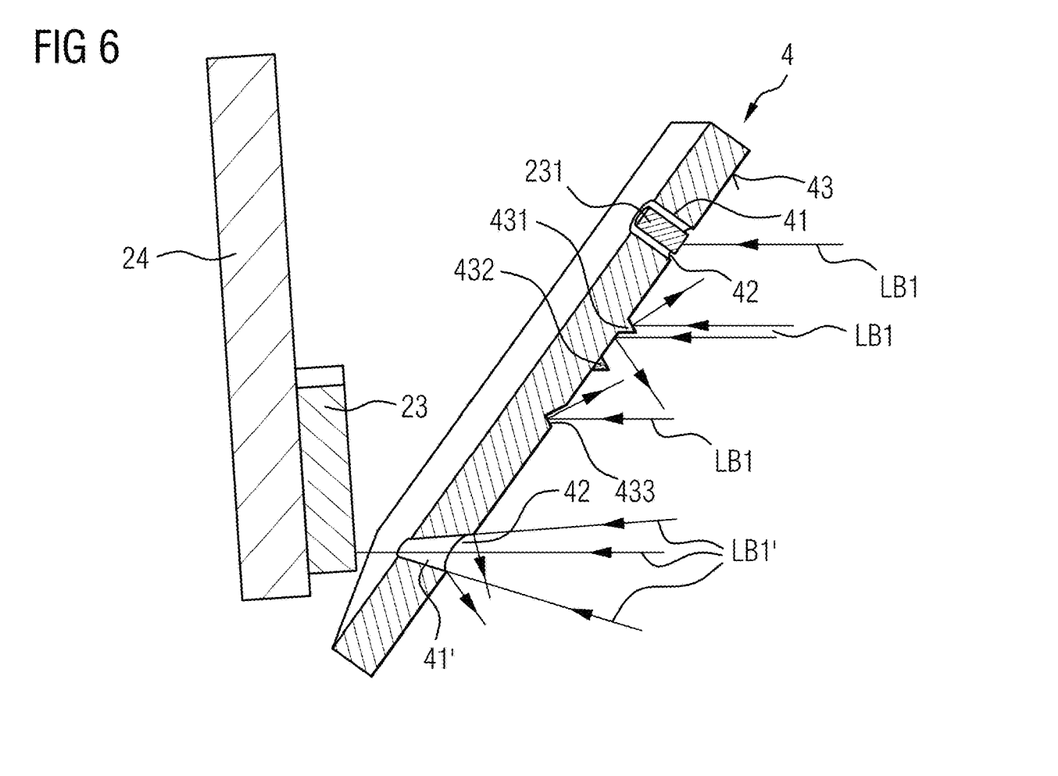
FIG. 6 shows variants of a mirror with a hole

FIG. 6 shows further variants of a mirror 4 of an imaging unit of a head-up display according to the invention, not all of which are necessarily present simultaneously. A mirror may only comprise one of these variants. In the upper region of the mirror 4 in the figure a bore 41, which is arranged perpendicular to the mirror surface 43, is shown. A photodiode 231 is arranged in the bore 41. The light falling through the hole 42 thus reaches the photodiode 231 directly, so that the relative alignment between the axis of the bore 41 and the direction of the incoming light bundle LB1 does not play a large role.

Underneath the bore 41 in the figure, a reflection element 431 is shown, which protrudes from the surface of the substrate 44 and which reflects a part of the incoming light bundle LB1 in a different direction from the largest part of the mirror surface 43. In the case illustrated here, the reflection element 431 is part of the substrate 44. As an alternative to this, a reflection element 432 is shown, which is attached separately to the mirror surface 43, for example by gluing. While it is true that the gluing does represent a further working operation, it can however be more economical, depending on the circumstances, than the manufacture of the reflection element 431 contiguously with the substrate 44. The latter can also be attached to the substrate 44 by gluing before the application of the mirror surface 43. Alternatively, it is an integral part of the substrate 44, for example if this is formed as an injection molded part.

A protrusion for the reflection element 431 is then correspondingly provided in the injection mold. A further variant consists in that a separate reflection element is inserted into the substrate 44 and fixed there by friction. In this case, the reflection element and the substrate 44 have material properties that are appropriately matched to one another.

A protrusion for the reflection element 431 is then correspondingly provided in the injection mold. A further variant consists in that a separate reflection element is inserted into the substrate 44 and fixed there by friction. In this case, the reflection element and the substrate 44 have material properties that are matched to one another.

As an alternative to this, the reflection element 433 is provided as a recess in the substrate 44. Here again, a part of the incoming light bundle LB1 is coupled out of the main beam path through reflection at a surface of the reflection element 433, and directed to a photodiode, not illustrated here.

According to one variant, instead of one of the reflection elements 431, 432, 433, a plurality of such reflection elements 431, 432, 433 are provided, each of which directs a small part of the light falling onto the mirror surface 43 onto a photodiode 23. Accordingly, the reflection elements 431, 432, 433 are each smaller, and are distributed over a larger area. They thus represent, as it were, a mean value, and are less dependent on a chance, non-representative, intensity distribution at the site of a single hole 42. This also applies to the arrangement of multiple holes 41, 41'. Instead of a photodiode, any other suitable type of photo sensor can be used.

In a further alternative variant, a bore 41' is provided which tapers down coming away from the side of the mirror 4 with the mirror surface 43. The incoming light bundle LB2' is here convergent, so that the light falling through the hole 42 into the bore 41' nevertheless does not reach its walls if the bore 41' is oriented corresponding to the main direction of the light bundle LB2'. It then falls on the photodiode 23. Here again, at least a part of the bore 41' can be mirror-coated during the manufacture of the mirror surface 43, which reduces any light losses due to light meeting the walls, since this is reflected and thus reaches the photodiode 23.

These embodiments relate in general to a device and an arrangement for measuring illumination intensity and for white point monitoring within a DMD projector or another projector. Such projectors are used, for example, in head-up displays with reflecting display elements or, in general, in imaging units with reflecting display elements.

Projectors with a digital micromirror device, known for short as DMD projectors, are employed in practice in a large number of different applications for generating a real image. Such DMD projectors have, amongst other things, a DMD chip as a surface light modulator, the display element 5, and an illumination system. The illumination system consists primarily of one or a plurality of light emitters, one or a plurality of collimation lenses, a beam folding system, a beam forming system, an illumination homogenization element and a beam guidance system. The illumination system has, amongst other things, the task of illuminating the chip surface of the DMD chip of the display element 5 homogeneously. A homogeneous illumination intensity and a telecentric illumination is hereby realized on the DMD chip. The light power impinging on the display element 5 correlates to the brightness of the generated virtual image 13. DMD color projectors either consist of a plurality of light emitters each of which emits a different light spectrum or, however, of one or a plurality of white light sources in combination with various color filters that can be arranged on color wheels. The RGB color space of a DMD color projector is either realized through additive or sequential color mixing of the light power emitted from the various light sources 3.

It may be needed in practice to metrologically detect the luminous flux of the light sources 3 or the luminous flux of the various color channels, for example red, green and blue. In order, for example, to be able to regulate the image brightness or the colorimetric locus, for example the white point, of the image. A part of the luminous flux impinging on the display element 3 is coupled out optically for this purpose with the aid of an outward coupling element, and directed to the photodiode 23, 231. The photodiode 23, 231 absorbs the light power falling on it, and converts it into an electric photocurrent which is proportional to the illumination intensity and which serves as the regulation variable of a control loop.

The following aspects amongst others play a role in the evaluation of the outward coupling mechanism and of the location of the outward coupling: the robustness of the measured photocurrent in respect of a change in the outward coupling location resulting from tolerances; the adjustment effort during manufacture; the outward coupling efficiency; the impairment of the image quality through the outward coupling element at the outward coupling location, for example through shading, the generation of scattered light, or similar; the necessary installation space; the costs of the components required to realize the outward coupling.

According to one variant, a bore 41 in a beam-folding mirror, the mirror 4, which is located behind the illumination homogenization element serves as the outward coupling element. The selection of this outward coupling location has robustness in respect of positional tolerances. The robustness in respect of the positional tolerance of the bore results from the fact that light falling onto the beam-folding mirror in the lateral direction as a result of the illumination homogenization which, for example, takes place through a microlens array together with a lens, has an almost constant lateral intensity distribution. The selection of the outward coupling location also has no unwanted shading taking place on the display element, and thus in the virtual image.

The outward coupling efficiency can, moreover, be achieved through the hole, which allows for a small hole diameter and thus entails only a very small loss of the optical efficiency of the overall system. It is to be noted at this point that in addition to the bore 41, numerous other possibilities for the realization of the hole, that is the outward coupling mechanism, are present in the beam-folding mirror. According to one variant, this is a mirror 4 whose mirror coating is located on a transparent substrate 44, glass or transparent plastic for example. There is no mirror coating on the mirror surface in the region of the outward coupling location, so that light impinging at this location can be transmitted through the mirror substrate and detected behind the mirror 4 by the photodiode 23, 231. According to one variant, this is a mirror 4 on whose surface one or a plurality of small reflection elements 431, 432, 433 are located locally at the outward coupling location, and direct the light that is to be coupled out onto the photodiode 23 which can be located outside the optical path of the projector.

A liquid-crystal element known as an LCoS can also be provided for the display element 5 as a surface light modulator, or a digital micromirror device known as a DMD.

One exemplary embodiment is an imaging unit that consists of a DMD color projector and that is used for image generation in a head-up display. Such a DMD color projector has a light source 3 shown in FIG. 7 which comprises a red light-emitting diode 311, a green light-emitting diode 312 and a blue light-emitting diode 313 as light emitters. Three collimation optics, here illustrated by converging lenses 321-323, have the task of collecting and collimating the light emitted by the light-emitting diodes 311-313. The collimated light of the three color channels is combined by means of dichroic mirrors 331-333 into one beam, folded, and guided to an illumination homogenization element 34. The beam volumes of the three color channels are overlaid concentrically in the course of the folding.

Figure 7:
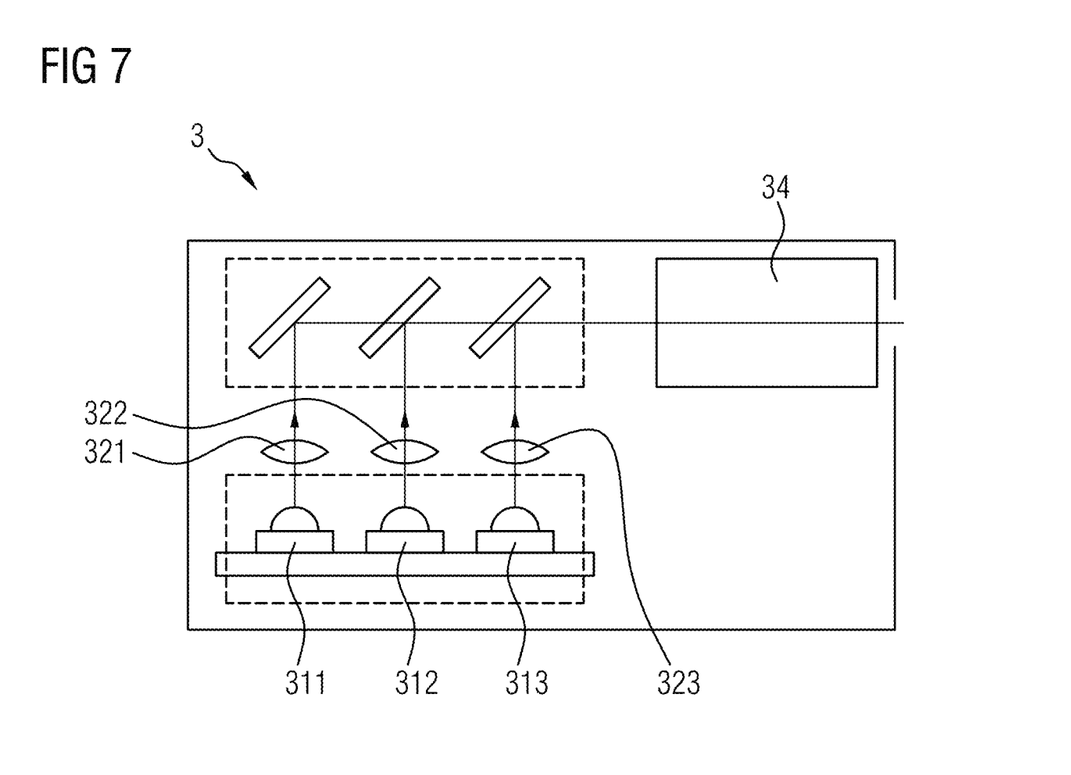
FIG. 7 shows a light source of a head-up display

The light 34 coming from the illumination homogenization element is directed via a converging lens, not illustrated, and the mirror 4, which is also not shown in this illustration, onto a DMD chip, the display element 5, and illuminates this homogeneously. The small bore 41, which couples out part of the light falling on the mirror 4, is located in the mirror 4. A photodiode 23 for measuring the luminous flux is located behind the mirror 4, immediately behind the bore 41 or, as in shown in some of the illustrations, located in it.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A head-up display comprising:
a light source;
a display element;
at least one mirror having a mirror surface which defines a hole in at least one location;
a mirror element;
an illumination homogenization element arranged between the light source and the mirror; and
a photodiode arranged in the beam path of light coming from the light source and passing through the hole; and
wherein the hole is a bore in a substrate that carries the mirror surface and the bore has a cross-section that changes in the direction of the bore.

2. The head-up display as claimed in claim 1, wherein the bore is mirror-coated in at least its region that is proximate to the mirror surface.

3. The head-up display as claimed in claim 1, wherein the hole is formed in a location in the mirror surface that is not mirror-coated.

4. The head-up display as claimed in claim 1, wherein the mirror is arranged in the beam path of the light coming from the light source following an illumination homogenization element.

5. A head-up display comprising:
a light source;
a display element;
at least one mirror having a mirror surface which defines a hole in at least one location;
a mirror element;
an illumination homogenization element arranged between the light source and the mirror; and
a photodiode arranged in the beam path of light coming from the light source and passing through the hole, wherein the hole is formed by a reflection element lying outside the mirror surface.

6. The head-up display as claimed in claim 5, wherein the mirror is arranged in the beam path of the light coming from the light source following an illumination homogenization element.

* * * * *